May 1, 1951  R. POLK, SR., ET AL  2,551,156
FRUIT PEELING METHOD AND APPARATUS
Filed May 21, 1946  3 Sheets-Sheet 1
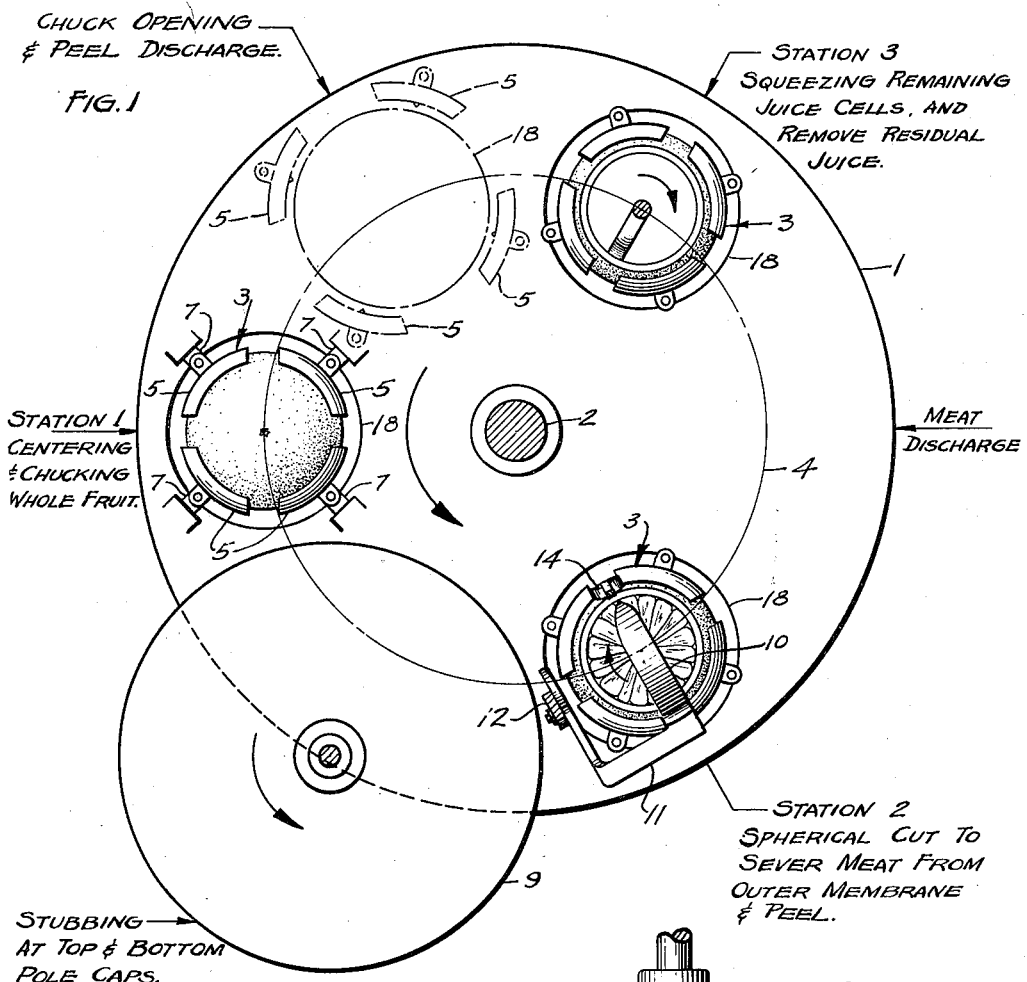
Inventor
RALPH POLK, SR., & RALPH POLK, JR.
By Semmes, Keegin, Beale and Semmes
Attorneys May 1, 1951  R. POLK, SR., ET AL  2,551,156
FRUIT PEELING METHOD AND APPARATUS
Filed May 21, 1946  3 Sheets-Sheet 2
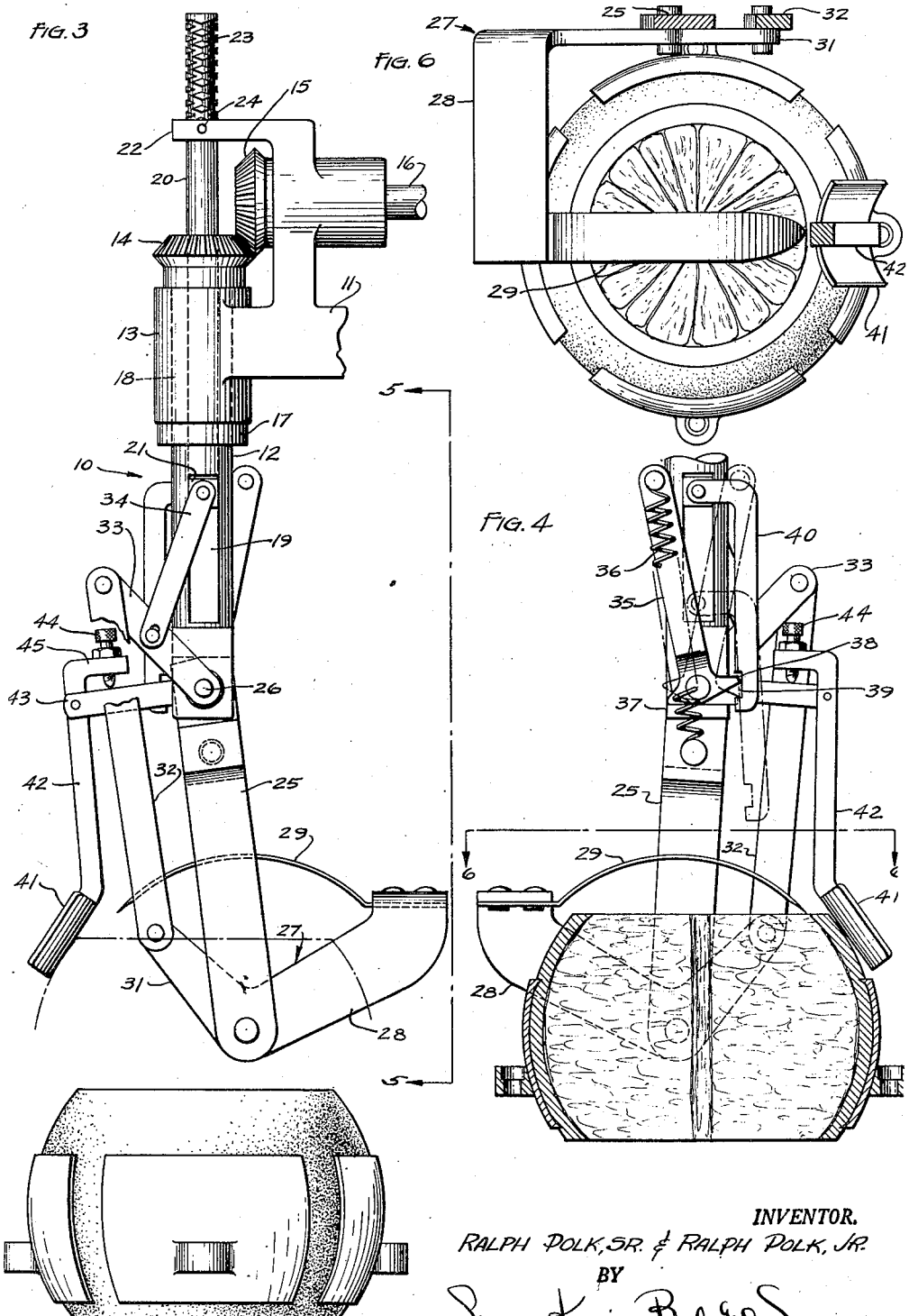
INVENTOR.
RALPH POLK, SR. & RALPH POLK, JR.
BY
Semmes, Keegin, Beale and Semmes
ATTORNEYS May 1, 1951  R. POLK, SR., ET AL  2,551,156
FRUIT PEELING METHOD AND APPARATUS
Filed May 21, 1946  3 Sheets-Sheet 3
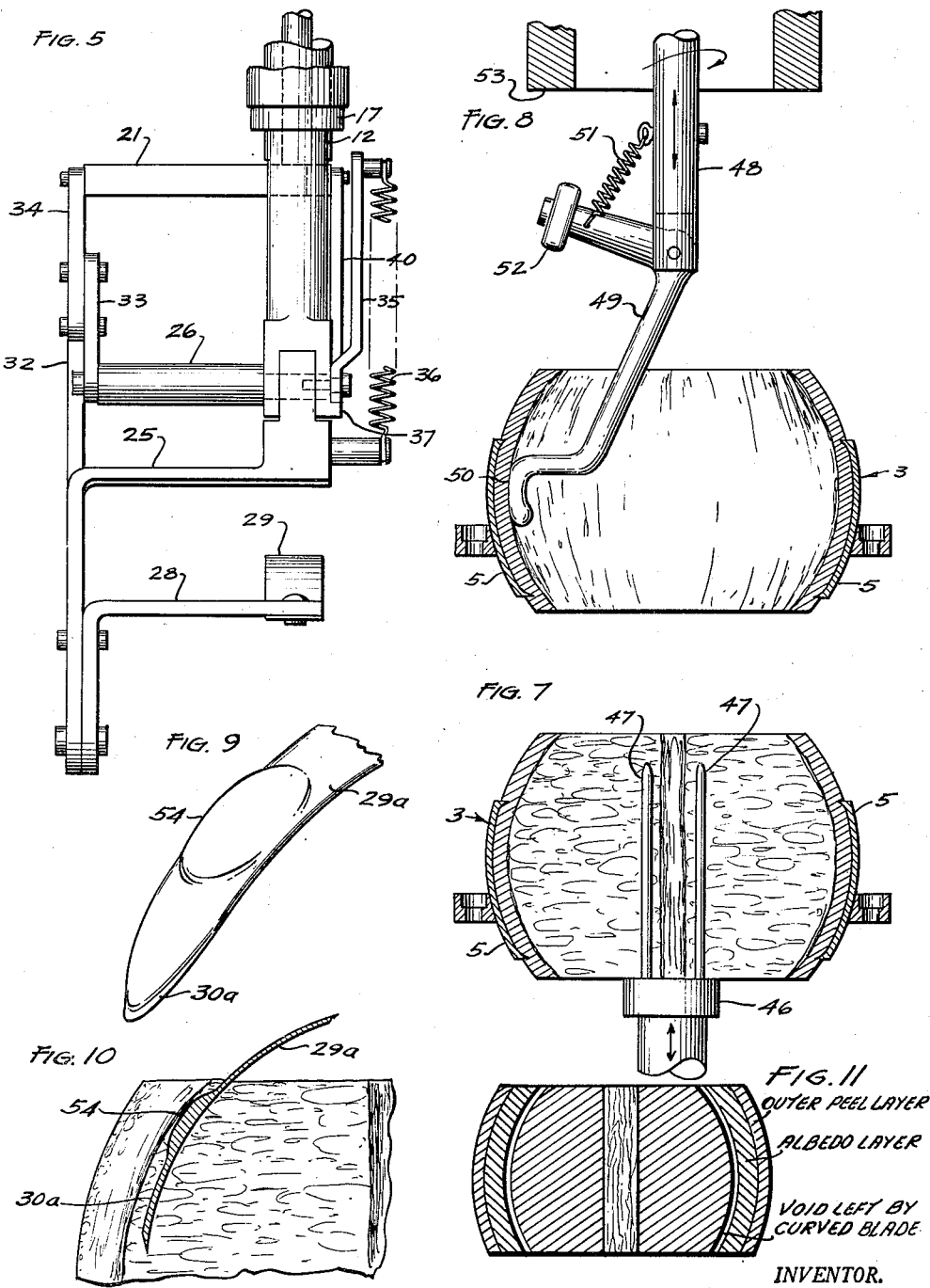
INVENTOR.
RALPH POLK, SR. & RALPH POLK, JR.
BY
ATTORNEYS

UNITED STATES PATENT OFFICE 2,551,156

FRUIT PEELING METHOD AND APPARATUS

Ralph Polk, Sr., Miami, and Ralph Polk, Jr., Tampa, Fla., assignors to The Polk Development Company, Tampa, Fla., a copartnership of Florida Application May 21, 1946, Serial No. 671,134

5 Claims. (Cl. 146—236)

This invention relates to peeling of fruit and more particularly to a method and apparatus for removing the outer peel and the thin layer immediately underlying the same from fruit having a relatively thick peel or rind. The invention is particularly adaptable for removing the peel and outer segmental membrane from citrus fruit such as grapefruit and oranges in order that the meat of the fruit may be subsequently operated upon, for example, sectionized, and will be described in connection with peeling such fruit. It will be understood, however, that the invention will be found adaptable also for peeling other types of fruit such as pineapples.

The meat of citrus fruit is composed of bundles or carpels of interconnected juice sacs, each carpel being in the form of a segment surrounded by a thin wall of membrane. The carpels surround a soft, pithy core and are surrounded by the rind or peel of the fruit which consists of an outer, colored layer and a spongy, white inner layer or albedo.

For the purpose of this application, the term "meat" will refer to the group of segments as a substantial whole. The portions of the carpellary membrane which extend more or less radially from the core will be referred to as "radial membrane" while the portions of the carpellary membrane which lie adjacent the peel will be referred to as the "outer membrane."

In the packing industry citrus fruit is first peeled prior to subsequent treatment of the meat, one of such treatments being sectionizing or dividing the meat into membrane free, substantially whole segments. Peeling, as heretofore carried out, if by hand, has been a tedious and expensive operation requiring skilled labor and, if by machine, has not proved entirely satisfactory because of the inability of the prior peelers to completely remove the albedo from the fruit. Moreover, when peeled for the purpose of sectionizing, the outer membrane of the fruit segments must also be removed.

This latter operation, as usually performed, is by subjecting the peeled fruit to a hot lye treatment which has several disadvantages being, in itself, time consuming and requiring that the fruit be subsequently washed and cooled. Moreover, the lye treatment bleaches the color of the fruit somewhat, imparts a slight "cooked" taste to the fruit and is disagreeable to operate. Further, the hot lye treatment fails to remove a thickened portion of the membrane at the juncture of the outer and radial membranes of the segments to which the juice cells strongly adhere, making subsequent sectionizing somewhat difficult to perform without tearing or mutilating the meat segments.

It is one of the objects of this invention, therefore, to provide a method and apparatus for mechanically peeling citrus fruit which will completely remove the peel and outer membrane therefrom to expose the meat as a substantial whole for subsequent treatment or operations.

Another object of the invention is to provide a method and apparatus for removing the meat of citrus fruit as a substantial whole from its peel and outer membrane of its segments while mechanically supporting the fruit by a band of its peel until the meat is finally severed from the peel.

Still another object of the invention is to provide a method and apparatus for performing the above operations, and in which the juice cells remaining attached to the holding band of peel are ruptured to extract the juice therefrom.

A further object of the invention is to provide a method and apparatus for peeling citrus fruit to remove the meat therefrom as a substantial whole, in which the peel and outer membrane are severed from the meat, first adjacent the polar ends of the fruit leaving an equatorial band of the peel intact by means of which the meat is supported, and then severing the meat from said band of peel.

Another object of the invention is to provide a method and apparatus for peeling citrus fruit to remove the meat therefrom as a substantial whole, in which the peel and outer membrane are severed from the meat, first adjacent the polar ends of the fruit leaving an equatorial band of the peel intact by means of which the meat is supported, and then severing the meat from said band of peel while separately supporting both the band of peel and the meat.

A still further object of the invention is to provide a method and apparatus for mechanically removing the peel and outer membrane from the meat of the citrus fruit to expose said meat as a substantial whole for subsequent operations which is rapid and economical in operation and requires relatively simple mechanism.

To accomplish these and other important objects which will become more apparent during the course of the following description, the invention consists in the procedural steps and the parts and combinations hereafter set forth with the understanding that various changes may be made therein by those skilled in the art without departing from the spirit of the invention.

This invention is directed to industrial, rapid production methods of mechanically peeling citrus fruit and is not to be confused with hand methods and devices, such, for example, as disclosed in Patent 1,452,930, issued to Ralph Polk, April 24, 1923.

Generally the invention comprises supporting citrus fruit such as grapefruit in a suitable chuck arrangement which engages the outer peel of the fruit in the equatorial region thereof and while so supporting, first cutting off polar cap portions of the peel and underlying outer membrane of the segments to expose the meat at the poles while leaving an equatorial band of the peel intact on the meat and then severing the meat as a substantial whole from the band of peel and the remaining outer membrane. Concurrently with this last operation or subsequently thereto the juice sacs remaining in the band of peel may be squeezed to extract their juice while the band of peel is still supported and backed up by the chuck.

More specifically, the fruit is passed by a cyclically operated machine from a loading station where it is inserted in a holding chuck, then past a cutting mechanism which cuts off the polar portions of the peel and the underlying portions of the segment membranes. This cutting mechanism may be of a type which will make a spherical or conical cut, but since grapefruit are naturally flattened at their poles, conveniently and for rapid operation, the fruit may be conventionally "stubbed" or sliced along parallel planes normal to the polar axis just sufficiently inwardly from the poles to remove the polar portion of the peel and just the polar ends of the segments. Such stubbing will leave the segments substantially whole.

The stubbed fruit, still supported in the chuck, is then passed to a second station where a rotary knife mechanism having a curved blade is brought into operation to make a generally spherical cut which follows the peel contour in a helical path just inside the outer membrane from one stubbed end to the other to sever the meat as a unit from the outer membrane and peel.

During this spherical cutting operation the knife, which may be specially constructed as described later, may function also to exert an outward pressure on the band of peel and serve thereby to squeeze the juice cells and portions thereof remaining attached to the outer membrane to extract the juice therefrom. Alternately and preferably, however, after the meat is severed from the band of peel, the meat is removed therefrom and the band of peel still retained in the chuck is passed to a third station where a separate tool is brought into action which exerts a rubbing action having a resilient radially outward pressure component against the peel to squeeze the juice from the remaining sacs. The chuck is then opened and the band of peel released preparatory to chucking another fruit and the chuck returned to the loading station.

During the spherical cutting operation it may be desirable to support the meat in addition to the support afforded by the band of peel. In such case, a pronged spindle, carried by the machine, may be inserted axially into the meat to straddle the core just inside the apices of several of the segments. This spindle support will serve to prevent relative rotation of the meat with respect to the peel and also maintain the meat axially aligned with the peel during the latter portion of the spherical cutting operation and particularly after the meat is severed and while the knife is being withdrawn.

In the accompanying drawings, which are employed to make the invention more clearly understood there is shown, somewhat diagrammatically, apparatus by means of which the invention may be practiced. It is to be understood, however, that the apparatus illustrated is shown by way of example only and the invention is not to be limited by the particular apparatus shown and described.

In the drawings:

Figure 1 is a diagrammatic view illustrating the cycle of operations for carrying out the invention.

Figure 2 is a transverse sectional view of a fruit showing diagrammatically means for holding the fruit peel during the cycle of operations and means for removing polar cap pieces from the fruit.

Figure 3 is a view in side elevation showing somewhat diagrammatically a cutting mechanism which may be employed for making a spherical cut inside the supporting band of peel to sever the meat therefrom and from the outer membrane adjacent thereto.

Figure 4 is a side elevational view partially broken away of the opposite side of the mechanism shown in Figure 3.

Figure 5 is a fragmental end view of the mechanism shown in Figures 3 and 4.

Figure 6 is a horizontal cross sectional view taken along the line 6—6 of Figure 4.

Figure 7 is a transverse sectional view through a piece of fruit supported by a band of its peel and showing in elevation additional means for supporting the meat.

Figure 8 is a transverse sectional view of the supported fruit peel band after removal of the meat showing in elevation, and somewhat diagrammatically, means for squeezing juice from cells remaining attached thereto.

Figure 9 is a fragmental view in perspective of a modified form of spherical cutting blade.

Figure 10 is a fragmental transverse sectional view of a piece of fruit showing the squeezing action of the blade shown in Figure 9 against the outer surface of the peel of the fruit to extract juice from the sacs adhering thereto.

Figure 11 is a view in perspective of the meat of the fruit as severed from the peel in accordance with this invention.

Referring more particularly to the drawings and first to Fig. 1 there is illustrated diagrammatically a fruit supporting table or carriage 1 which is rotatable, preferably, about a vertical axis 2. Positioned on the carriage 1, concentric with its rotational axis, is a circular series of equally spaced chucks, designated generally as 3, for holding the fruit to be operated upon and advancing it from a loading station to succeeding stations for the successive operations of the process. The carriage 1 may be rotated in step by step movement in well known manner, such as by a Geneva drive (not shown) to bring the chucks in operative position at the several operating stations.

The fruit is centered in the chucks, either by hand or suitable mechanism, with its polar axis or core vertical and coinciding with a circular path (indicated by the dotted line 4) passing through the center of the operating units to be described. Since the core or polar axis of citrus fruit is very seldom in the exact center of the fruit, the chucks 3 are preferably provided with a plurality of independently movable fruit gripping jaws 5 provided with concave faces which may be moved independently into engagement with the outer peel of the centered fruit at substantially, or slightly below, the horizontal midsection of the fruit.

Referring to Figure 2, short prongs or teeth 6 may be provided on the chuck jaws to penetrate the peel slightly and assist in holding the fruit. The jaws 5 are movably attached to the table, such as by movable supporting members 7, and preferably engage the fruit with substantially equal pressure to maintain its centered position and natural shape of the peel throughout the process. The jaw pressure may be maintained until released after the final process step, by suitable one-way restraining means such as sprags 8 engaging the supporting members 7.

Located between the loading station of the machine (station 1, Fig. 1) and station 2, are a pair of parallel, capping or "stubbing" knives 9. These knives, as best seen in Figure 2, are preferably circular knives mounted on separate shafts but preferably rotating about a common vertical axis. The knives are spaced apart and relative to the fruit to cut off substantially equal polar cap portions as the fruit is advanced from station 1 to station 2. These cuts are preferably made deep enough polarwise of the fuit to expose the meat of the segments at opposite ends of the fruit as shown in Figure 2.

After stubbing, the fruit is advanced to station 2 where the meat is severed from the band of peel and remaining outer membrane by means of a curved blade, rotary cutting mechanism designated generally as 10 and preferably supported above the carriage 1, at station 2, by means of a stationary bracket or support 11 and operative to make a downward, rotary cut through the fruit just inside the outer membrane thereof following the contour of the band of peel.

The mechanism 10 comprises a shaft 12 journalled for rotation in a bearing 13 in the bracket 11 and is provided on its upper end with a bevel gear 14 which meshes with a bevel gear 15 on the end of a drive shaft 16 likewise journalled in the bracket 11. The shaft 12 is held against axial displacement between the gear 14 and a collar 17 engaging opposite ends of the bearing 13.

The shaft 12 is provided with an axial bore 18 from its upper end which communicates with a transverse slot 19 below the bracket. Mounted for axial movement in the bore 18 is a rod 20 having its lower end attached to a cross bar 21 which extends through and rides in the slot 19. The upper end of the rod 20 moves through an aperture in an extension 22 of the bracket 11 and is provided with a continuous, reversed, helical groove or lead thread 23 in which rides a pin 24 carried by the extension 22 to effect a reciprocating axial movement of the rod with respect to the shaft 12 upon rotation of the shaft and rod. The drive shaft 16 is adapted to be coupled to suitable driving mechanism, not shown, but preferably synchronized with the machine and timed to effect one complete up and down reciprocation of the rod 20 while the fruit is positioned at station 2.

The lower end of the shaft 12 is bifurcated and has pivotally attached thereto the upper end of a bracket 25 by means of a pin 26, one end of which extends laterally from the shaft. The bracket 25 is offset radially from the shaft 12 and has pivotally attached to its lower end a bell crank 27. One arm 28 of the bell crank 27 is in-bent and has secured thereto one end of a curved blade 29 which extends forwardly from the arm 28 in a curve corresponding substantially to the curvature of an average fruit and intersects the axis of rotation of the shaft 12. The free end of the blade 29 is shaped to a point 30 and portion of one edge adjacent the point is sharpened. The remainder of this edge and the opposite edge, however, are preferably dull.

Pivotally attached to the other arm 31 of the bell crank 27 is one end of a rod 32 the opposite end of which is pivotally attached to the outer end of a lever 33 pivotally connected at its inner end to the extension of the pin 26 in the pivotal axis of the bracket 25. A second rod 34 connects an intermediate point of the lever 33 with the extended end of the cross bar 21. As will be seen in Figures 3 and 4, the curved blade 29 is substantially concentric with the pivotal axis of the bell crank and rotation of the shaft 12, and the accompanying axial movement of the rod 20, as set forth, will cause the point of the blade 29 to follow a spherically arranged helical path.

Because fruits are of different sizes and because of the fact that they are very seldom round and the polar axis is very seldom in the center of the fruit, and further because the peel of different kinds of fruit and fruit at different stages of maturity are of different thicknesses, it is desirable that the blade 29, rather than make a truly spherical cut through the fruit, should be guided by the contour of the fruit peel. This may be accomplished as follows.

Pivotally attached adjacent the lower end of the shaft 12, for example, to the end of the pin 26 is an upstanding arm 35 adapted to swing in a limited arc on opposite sides of the vertical plane passing through the pivotal axis of the bracket 25. The upper or free end of the arm 35 carries one end of a tensioning spring 36 the opposite end of which is attached to a pin carried by the bracket 25 below its pivotal axis. The arc of swing of the arm 35 may be conveniently controlled by shaping the lower end thereof with angular faces, as shown in Figure 4, to engage a shelf 37 on a shaft 12. The arc of swing of the bracket 25 may likewise conveniently be controlled by shaping its upper end with angular faces to engage the upper wall of the bifurcation in the shaft 12 as indicated in Figure 3.

From the above, it will be seen that the bracket 25 will swing and be held resiliently on the same side of the vertical axis passing through its pivot point as that assumed by the free end of the arm 35. In other words, when the arm 35 is flipped in the direction toward the point of the blade 29, the point of the blade will be urged resiliently outwardly from the axis of rotation of the shaft 12, and if the arm is flipped in the opposite direction, the point of the blade 29 will be urged resiliently toward the axis of rotation of the shaft 12.

To flip the arm 35 from one position to the other with movement of the blade 29 about its horizontal axis of movement, the arm 35 is provided with a right angular offset 38 extending radially from the pivotal axis of the arm 35. Adapted to engage the end of the offset 38 is a notch 39 in the free end of a freely swingable, depending rod 40 carried by the cross bar 21.

As seen in Figure 4, when the cross bar 21 is in its extreme upper position, the upper shoulder of the notch 39 engages the offset 38 which is in a slightly upwardly inclined position. Upon the initial downward movement of the bar 21, the rod 40 moves the offset 38 through an arc which flips the arm 35 over to the opposite side as soon as the offset passes the horizontal center. On continued downward movement of the bar 21 the notch 39 rides over the now downwardly inclined offset 38 permitting unrestrained, continued downward movement of the arm 40 to the lower limit of travel of the cross bar 21. Upon return movement of the cross bar, the reverse takes place, that is, the cross bar continues to move upwardly until nearly the limit of its upward movement when the notch 39 reengages the offset 38 to flip the arm 35 back to its original position.

In order to guide at least the initial penetration of the blade 29 into the fruit to correctly start the cut just inside the outer membrane, there is provided an outwardly and downwardly inclined finger or follower 41 on the end of an arm 42 carried by a right angular extension 43 of the bracket 25 adjacent its point of pivotal attachment to the shaft 12. The arm 42 is preferably pivotally attached to the extension 43 in order that the follower 41 may be adjusted toward or away from the point of the blade 29. This may be accomplished by means of an adjusting screw 44 carried by a right angular extension 45 of the arm 42 and engaging the bracket extension 43, as shown in Figure 3.

The fruit is moved into position at station 2 preferably below the cutting mechanism 10 and, after moving into position, is elevated into cutting position with respect to the blade 29. This may be conveniently accomplished by raising the carriage 1 by suitable cam mechanism, in well-known manner. At this time the rod 20 will be in its up position and the bracket 25 flipped so that the point of the blade 29 and the follower 41 are urged toward the axis of rotation of the shaft 12. As the fruit moves to its up position the inclined follower 41 is engaged by the outer surface of the band of peel and, when the fruit is fully raised to the position shown in Figure 4, will move the bracket 25 about its pivotal axis so that the point of the blade will be in position to penetrate the meat just inside the outer membrane.

The shaft 12 is then rotated and the rod 20 fed downwardly which causes the point of the blade to penetrate the fruit. Since the point of the blade is still resiliently urged toward the axis of rotation of the shaft and the follower is engaging and following the outer surface of the band of peel, the point of the blade will follow a path corresponding to the peel contour. After blade 29 has penetrated a short distance downwardly into the meat, the bracket 25 is flipped, as described above, in the opposite direction and the point of the blade is now urged resiliently outwardly from the axis of rotation of the shaft 12 or toward the band of peel and thereafter for the remainder of the downward movement of the blade and its return movement, until the bracket is again flipped to its original position, the cutting point of the blade will follow automatically the peel contour and the meat of the fruit will be completely severed from the band of peel and outer membrane.

The severed meat may be removed from the band of peel at station 2 but preferably it is retained therein in its original position until after retraction of the blade 29 and until the fruit has completely cleared the cutting mechanism. Any suitable means such as a simple plunger (not shown) or the holding fork or spindle 46, to be described, may be employed to push the severed meat from the band of peel. This meat removal is easily accomplished for it will be understood that the albedo layer of citrus fruit is quite spongy and easily compressible and also that the blade 29 in its passage through and about the fruit leaves a slight void between the meat and the peel. As a result of the compressibility of the albedo and the reduced diameter of the severed meat, it has been found in practice that the meat may be removed from the band of peel through one of the capped ends without substantial mutilation of the meat. To provide a support for the meat in addition to that afforded by the peel and also to provide means which may serve to remove the severed meat from the band of peel, there may be provided a series of vertical, preferably non-rotatable, spindles 46, such as shown in Figure 7, equipped with a circular group of upright prongs 47 adapted to penetrate axially at least a portion of the segments closely adjacent the core of the fruit. The spindles are preferably positioned below the table 1, one in axial alignment with the core of each supported fruit, and are adapted to move with the table. These spindles are also capable of vertical up and down movement, operated by any convenient means at desired points in the operational cycle of the machine. For example, the spindles may be raised to penetrate the fruit after stubbing and before arrival thereof at station 2, or they may be raised after arrival of the fruit at station 2 and before or during the time when the spherical cut is being made. They may be lowered again after the spherical cut is made and the knife withdrawn and while the fruit is still at station 2 or they may be lowered after the chuck moves from station 2 at the time the meat is discharged from the band of peel.

This spindle support will be found particularly advantageous during the latter portion of the spherical cutting operation and after the cut is completed and the knife is being withdrawn, as it will support the meat non-rotatably and axially in alignment with the axis of rotation of the knife, and reduce thereby the possibility of the knife digging into and mutilating the meat.

Mechanical limitations make it almost impossible to sever the meat from the outer membrane so as to obtain all of the juice sacs in the severed meat, and consequently a number of unruptured and partial juice sacs will remain attached to the outer membrane within the band of peel. In order to recover this juice, the peel, while still maintained in the chuck 3, may be advanced to a third station where these remaining juice sacs may be squeezed and ruptured. A tool which may be employed for performing this operation is shown in Figure 8 and may comprise a shaft 48, rotatable about a vertical axis coinciding substantially with the axis of the peel and having pivotally connected to its lower end a bell crank arm 49. The depending end of the arm 49 is provided with an arcuate offset rubbing element 50 having a rounded face adapted to engage the inner surface of the peel. The rubbing element 50 is resiliently urged in a direction radially outwardly from the axis of rotation of the shaft 48 by means such as a spring 51 connecting the opposite end of the bell crank arm 49 with the shaft 48. The shaft 48 is capable of axial as well as rotative motion, as indicated by the arrows, and the bell crank arm may be provided with a roller 52 which, in the up position of the shaft, engages a circular stationary track 53 to move the rubbing element toward the axis of rotation of the shaft against the action of the spring 51.

When the peel is moved to a station 3, the rotating shaft 48 is lowered and, as the rubbing element 50 approaches the upper end of the peel, the roller 52 disengages the track 53 and the rubbing element is urged outwardly into spring pressed engagement with the inner surface of the peel. This rubbing element moves, with continued downward movement of the rotating shaft 48 in a helical path following the contour of the peel, rupturing the juice sacs adhering thereto and releasing the juice, which thereupon may be collected. At the end of the down stroke, the shaft 48 is retracted to its up position.

In lieu of extracting the residual juice from the band of peel by separate operation and by means of a separate tool, as above described, the juice sacs and portions thereof remaining attached to the outer membrane after the meat is cut therefrom may be squeezed and ruptured at the same time the spherical cut is made at station 2. To accomplish this, preferably a curved knife blade 29a, such as shown in Figure 9 and similar to the knife 29 and having a sharpened cutting point 30a, is made with a rounded thickened portion or bulge 54 on the convex face of the blade 29a just back from the sharpened cutting point. As seen in Figure 10, as the blade 29a cuts downwardly through the meat adjacent the inner surface of the peel, the spring 36, urging the blade outwardly against the peel, will cause the thickened portion 54 to press against the peel with a rubbing action and thereby squeeze the juice sacs adhering thereto.

After the meat is severed from the band of peel and the juice extracted from the remaining sacs by either of the above methods, the chuck 3 with the band of peel still retained therein is moved toward the loading station. During its passage from the last operating station back to the loading station, the sprags 8 may be released to allow the chucks to open and release the peel which will thereupon fall through the opening 18.

It will be understood that the polar caps removed from the fruit may be subjected to juice extraction operations by conventional methods. Such operations, however, do not form a part of this invention.

While in the foregoing, the tools, such as the spherical cutting blade 29 and the rubbing element 50 are rotated about vertical axes relatively with respect to stationary fruit and peel, it will be understood that the fruit and peel may be rotated about its polar axis with respect to non-rotating tools to accomplish the same result. For example, the curved blade 29 may be mounted for oscillation on a non-rotating support and moved downwardly through the fruit as the fruit is revolved to make the spherical cut. In this case, obviously the spindle 46 would be rotatably supported.

For simplicity, no driving mechanisms for the machine and the operating tools associated therewith have been shown, as such driving mechanisms form no part of the present invention. In this connection, however, it might be pointed out that the operating tools may be individually driven or driven from a common source of power timed with respect to the carriage movement in any one of a number of well-known manners.

We claim:

1. A method of segregating desired constituents of citrus fruit from the peel thereof comprising supporting the fruit by unyielding pressure exerted in a direction normal to the outer peel of the fruit substantially about the equatorial region thereof, removing at least the peel and outer membrane from the fruit adjacent opposite poles thereof while leaving an equatorial band of peel intact on the fruit, severing the meat from the equatorial band and outer membrane by a spherical cut along lines closely adjacent the inner surface of the outer membrane, removing the severed meat from said band of peel, and rupturing the juice sacs remaining attached to said outer membrane by a rubbing pressure directed radially outward on the peel wall and about said wall to extract the juice therefrom while still maintaining said unyielding pressure.

2. Apparatus for severing the meat as a substantial whole from stubbed citrus fruit comprising a blade having a cutting point and a longitudinal face curvature corresponding substantially to the curvature of an average fruit, a support for the blade having means mounting the blade thereon for oscillation about an axis coinciding substantially with the center of curvature of the blade and additionally for rotation about an axis perpendicular to said axis of oscillation, holding means supporting the fruit adjacent the blade with the polar axis thereof substantially aligned axially with said axis of rotation and the center of the fruit lying substantially in a plane containing said axis of oscillation, mechanism for moving the blade simultaneously about said axes to move the cutting point in a helical path through the fruit, and means including a resilient element connected between the holding means and the blade mounting exerting a yielding force on the blade radially outward from the axis of rotation and urging the convex face of the blade toward the peel to guide the cutting point according to the contour of the peel.

3. Apparatus for severing the meat as a substantial whole from stubbed citrus fruit comprising a blade having a cutting point and a longitudinal face curvature corresponding substantially to the curvature of an average fruit, a support for the blade having means mounting the blade thereon for oscillation about an axis coinciding substantially with the center of curvature of the blade and additionally for rotation about an axis perpendicular to said axis of oscillation, holding means including a first support engageable with the outer peel surface and a second support engageable with the meat in the apex region of the fruit segments, said first and second supports individually supporting the peel and meat portion of the fruit adjacent the blade with the polar axis thereof substantially aligned axially with said axis of rotation and the center of the fruit lying substantially in a plane containing said axis of oscillation, mechanism for moving the blade simultaneously about said axes to move the cutting point in a helical path through the fruit, and means including a resilient element connected between the holding means and the blade mounting exerting a yielding force on the blade radially outward from the axis of rotation and urging the convex face of the blade toward the peel to guide the cutting point according to the contour of the peel.

4. Apparatus for severing the meat as a substantial whole from stubbed citrus fruit comprising a blade having a cutting point and a longitudinal face curvature corresponding substantially to the curvature of an average fruit, a support for the blade having means mounting the blade thereon for oscillation about an axis coinciding substantially with the center of curvature of the blade and additionally for rotation about an axis perpendicular to said axis of oscillation, holding means supporting the fruit adjacent the blade with the polar axis thereof substantially aligned axially with said axis of rotation and the center of the fruit lying substantially in a plane containing said axis of oscillation, mechanism for moving the blade simultaneously about said axes to move the cutting point in a helical path through the fruit, a guaging member carried by the mounting means for the blade and spaced a set distance from said point and adapted to engage the outer peel surface to determine the line of initial penetration of the point into the fruit, and means including a resilient element connected between the holding means and the blade mounting exerting a yielding force on the blade radially outward from the axis of rotation and urging the convex face of the blade toward the peel to guide the cutting point according to the contour of the peel.

5. A method of segregating desired constituents of citrus fruit from the peel thereof comprising supporting the fruit by unyielding pressure exerted in a direction normal to the outer peel of the fruit substantially about the equatorial region thereof, removing at least the peel and outer membrane from the fruit adjacent opposite poles thereof while leaving an equatorial band of peel intact on the fruit, severing the meat from the equatorial band and outer membrane by a spherical cut along lines closely adjacent the inner surface of the outer membrane, and rupturing the juice sacs remaining attached to said membrane by a rubbing pressure directed radially outward of the peel wall and about said wall to extract the juice therefrom while maintaining said unyielding pressure, and removing the meat from the band of peel.

RALPH POLK, Sr.
RALPH POLK, Jr.

REFERENCES CITED

The following references are of record in the file of this patent:

UNITED STATES PATENTS

| Number | Name | Date |
|---|---|---|
| 1,277,148 | Starr | Aug. 27, 1918 |
| 1,452,930 | Polk | Apr. 24, 1923 |
| 1,631,854 | Carroll | June 7, 1927 |
| 1,653,552 | Duncan | Dec. 20, 1927 |
| 1,836,320 | Goranson et al. | Dec. 15, 1931 |
| 2,210,974 | De Prume | Aug. 13, 1940 |
| 2,309,328 | Polk, Sr., et al. | Jan. 26, 1943 |
| 2,342,131 | Erickson | Feb. 22, 1944 |
| 2,396,444 | Singer | Mar. 12, 1946 |